Patented Dec. 10, 1929

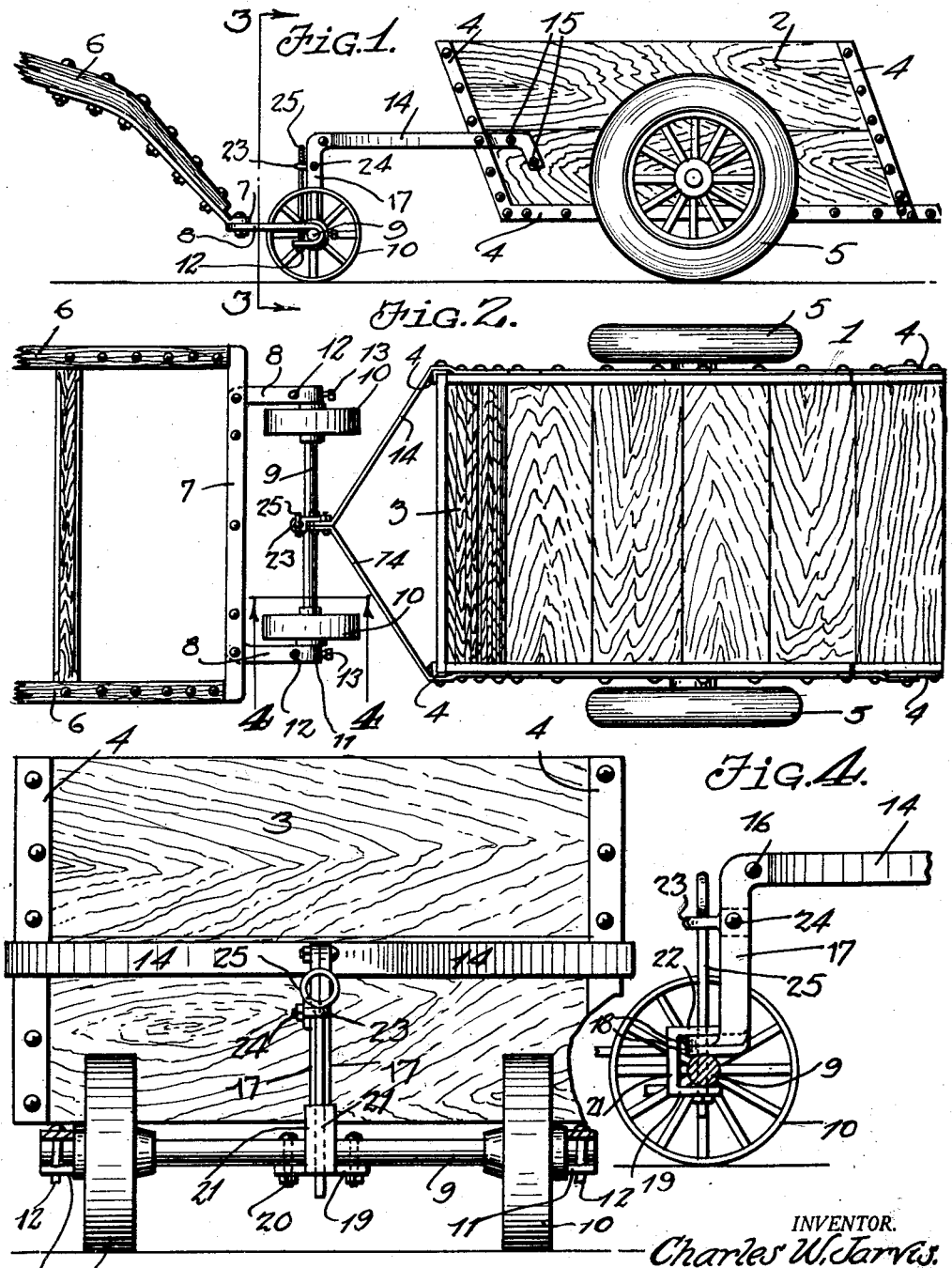

1,739,463

UNITED STATES PATENT OFFICE

CHARLES W. JARVIS, OF COURTLAND, CALIFORNIA

ASPARAGUS WAGON

Application filed May 10, 1929. Serial No. 362,002.

This invention relates to certain new and useful improvements in asparagus wagon and has for its primary object to provide a wagon in the form of a cart or trailer adapted to be detachably engaged with draft apparatus and designed to provide an open top and rear end to facilitate the placing of asparagus therein and being manually shiftable or transportable through an asparagus field until filled and thereafter engaged with draft apparatus.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view of an asparagus wagon constructed in accordance with the present invention and operatively attached to draft apparatus, fragmentarily illustrated;

Figure 2 is a top plan view;

Figure 3 is an enlarged vertical cross-sectional view taken on line 3—3 of Figure 1; and Figure 4 is an enlarged detail sectional view taken on line 4—4 of Figure 2.

Referring more in detail to the accompanying drawing, there is illustrated an asparagus wagon comprising a flat bottom 1, side walls 2, a forwardly inclined front wall 3 with the top and rear end thereof open, the lower edge of the side wall and ends thereof being reinforced by strap irons 4. The wagon is mounted upon cushion or pneumatic tired wheels 5 to prevent injury to the asparagus when the wagon passes over rough and uneven ground. The wagon is adapted to be manually transported while being loaded with asparagus and when filled is adapted to be engaged with draft apparatus and transported to a discharging base.

The draft apparatus may be in any form preferred, but for purposes of illustration, the same is shown as being horse drawn, comprising a shaft construction embodying side shaft arms 6 connected at their rear ends by a cross bar 7 from which a pair of arms 8 project rearwardly from points adjacent opposite ends thereof. An axle bar 9 has ground wheels 10 freely rotatable thereon adjacent each end, the axle bar extending through the ground wheels 10 and engaged by the U-shaped bent ends 11 of the arms 8 that are anchored thereto by the drop pin 12 extending through the arms 8 and lower end of the loop 11, the axle bar 9 being retained against rotation by the stud screws 13 passed through the ends of the loops and engaged with the axle bar.

A pair of strap irons 14 are anchored as at 15 to the opposite sides 2 of the wagon body and converge forwardly as illustrated in Figures 2 and 3 to be joined together by the rivet 16 and then directed downwardly in parallel relations as shown at 17 with the terminal ends angularly bent to overlap each other and be horizontally disposed as at 18 with alined apertures therein. A U-shaped bracket is anchored to the axle bar 9 intermediate its ends and comprises a base plate 19 bolted to the axle bar as at 20, the base plate 19 of the bracket carrying a vertical arm 21 located forwardly of the axle bar 9 with the upper end 22 directed rearwardly to overlie the bent ends 18 of the strap irons 14 and having an aperture therein to register with the apertures in the ends 18, the base plate 19 of the bracket being similarly apertured, as is also the axle bar 9. An eye bolt 23 is secured as at 24 to the depending arms 17 of the strap irons 14 through which a headed locking pin or bolt 25 is passed when coupling the asparagus wagon to the draft apparatus, the bolt 25 passing through the ring apertures in the upper and lower sides of the U-shaped bracket that is anchored to the axle bar 9, the bent ends 18 of the strap irons and the axle bar as shown in Figure 4.

After the wagon has been loaded, the same is engaged with the draft apparatus and transported to a suitable discharging point, the wagon being easily and quickly attached to and separated from the draft apparatus. The axle bar 9 carrying the ground wheels 10 remains engaged with the side shaft apparatus, while the wagon is adapted to be attached to and separated from the axle bar 9 by the devices shown more clearly in Figures 3 and 4.

While there is herein shown and described the preferred embodiment of the present invention, it is nevertheless to be understood that minor changes may be made therein without departing from the spirit and scope of the invention as claimed.

I claim:—

In a device of the character described, an asparagus wagon mounted upon rubber tired wheels, a pair of forwardly converging strap irons carried by the wagon, the forward meeting ends of the irons being downwardly directed in juxtaposed parallel relation with the lower terminal ends angularly bent forwardly into overlapping relation, and a wheeled draft device comprising a stationary axle bar upon which the overlapped ends of the strap irons are mounted, a U-shaped bracket anchored at its lower side to the axle bar with the upper side disposed above the axle bar and strap iron ends, and a bolt passed through the bracket, strap iron ends and axle bar to anchor the wagon to the draft device.

In testimony whereof I affix my signature.

CHARLES W. JARVIS.